Figure 1:
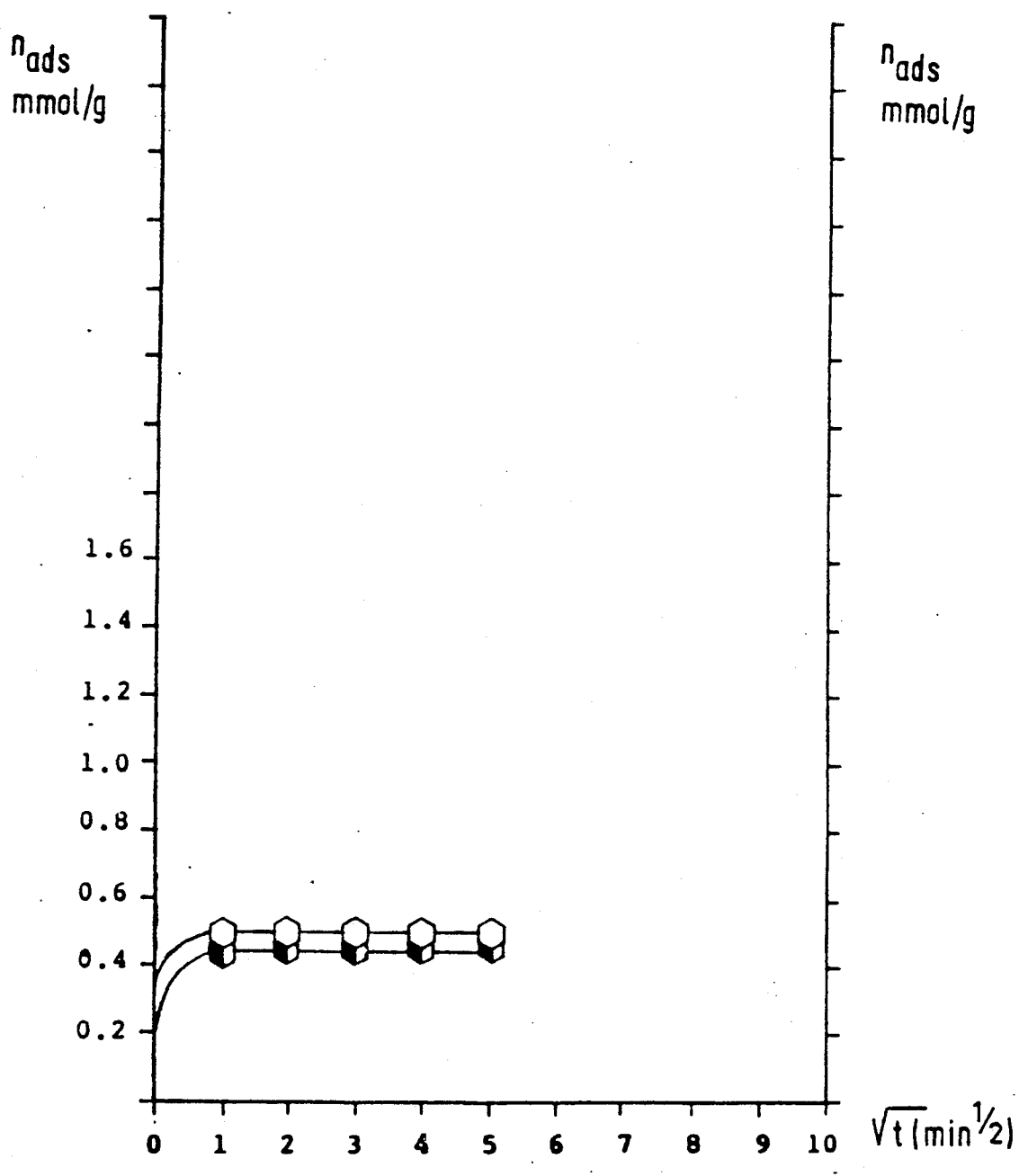

United States Patent [19]

Vansant et al.

[11] Patent Number: 5,039,641

[45] Date of Patent: Aug. 13, 1991

[54] PROCESS FOR MODIFICATION OF A MOLECULAR SIEVE

[75] Inventors: Etiénne Vansant, Zoersel, Belgium; Serge Moreau, Velizy Villacoublay, France; Jan Verbiest, Borgerhout, Belgium; Paul de Biévre, Kasterlee, Belgium; Jos Philippaerts, Houthalen, Belgium

[73] Assignee: Europese Economische Gemeenschap (E E G), Brussels, Belgium

[21] Appl. No.: 308,105

[22] Filed: Feb. 8, 1989

[30] Foreign Application Priority Data

Feb. 11, 1988 [EP] European Pat. Off. ............ 88200253

[51] Int. Cl.⁵ .............................................. B01J 29/06
[52] U.S. Cl. .......................................... 502/85; 502/60
[58] Field of Search ............................... 502/85, 60, 64

[56] References Cited

U.S. PATENT DOCUMENTS

| | | | |
|---|---|---|---|
| 3,326,818 | 6/1967 | Gladrow et al. | 502/64 |
| 3,377,295 | 4/1968 | Pryor | 502/64 |
| 3,382,187 | 5/1968 | Drost et al. | 502/64 |
| 3,740,347 | 6/1973 | Rosen et al. | 502/64 |
| 4,414,005 | 11/1983 | de Bievre et al. | 55/75 |
| 4,594,333 | 6/1986 | Chang et al. | 502/85 |

FOREIGN PATENT DOCUMENTS

| | | | |
|---|---|---|---|
| 95364 | 11/1983 | European Pat. Off. | 502/60 |
| 0173507 | 5/1986 | European Pat. Off. | |
| 2143340 | 2/1973 | France . | |
| 2512802 | 3/1983 | France | 502/60 |
| 68144 | 4/1982 | Japan | 502/60 |
| 1152930 | 4/1985 | U.S.S.R. | 502/84 |
| 1234359 | 5/1986 | U.S.S.R. | 502/60 |

*Primary Examiner*—Carl F. Dees
*Attorney, Agent, or Firm*—Weingarten, Schurgin, Gagnebin & Hayes

[57] ABSTRACT

The invention relates to a process for modifying a molecular sieve, whereby the molecular sieve is brought into contact with a modifying agent containing at least one weak acid, a salt of a weak acid or a derivative of a weak acid of at least one element of Groups III, IV or V of the Periodic Table of Elements, by dry mixing the molecular sieve and the modifying agent, optionally followed by adding liquid to form a slurry or paste, whereafter the resulting mixture is subjected to a thermal treatment.

11 Claims, 19 Drawing Sheets

PROCESS FOR MODIFICATION OF A MOLECULAR SIEVE

The invention concerns a process for modifying a molecular sieve, whereby the molecular sieve is brought into contact with a modifying agent.

The modification of molecular sieves is well known in the art. One type of modification, which is i.a. described in FR-A 2.143.340 is concerned with the increase of acid resistance of the molecular sieve. Another type of modification concerns the catalytic activity, which can be changed or modified by treatment of the molecular sieve with certain modifying agents. An example thereof is given in EP-A 173,507.

In U.S. Pat. No. 4,414,005 a process for modifying a molecular sieve or zeolite is described, wherein the molecular sieve in the H-form is treated with, for example, silane or diborane. The thus treated molecular sieve is then reacted with water.

Modification of molecular sieves or zeolites is an important process to obtain products with different properties. By modification both the chemical structure and the pore geometry of the molecular sieve are changed. This has an influence on the kind of molecules that can enter the pores, so that the catalytic properties and the separation characteristics of the molecular sieves are changed.

Both the molecular sieving and the adsorption selectivity may be altered by cation exchange or decationization, and/or preadsorption of polar molecules. The pore size and affinity of a molecular sieve can also be altered by a chemical modification of the molecular sieve structure using reactants as $X_x H_y$ ($SiH_4$ or $B_2H_6$). The free diameters of the zeolitic pores and therefore the molecular sieving properties of a zeolite, and also the electric field and hence the adsorption selectivity are permanently changed. The chemical modification with silane on zeolites Y, mordenite LP and dealuminated mordenite LP changes the intracrystalline free volume and the effective pore size of the zeolites. Similar, a chemisorption of diborane alters the sorption characteristics of zeolites. The mechanism of both modification procedures can be divided in three parts: the primary chemisorption of the reactant with the zeolite, the secondary reactions inside the channels and the reaction with water of the treated substrate. The effective pore size can be changed, in a controlled way, by applying silanation and/or boranation processes under well-defined reaction conditions, such as degree of chemisorption, reaction temperature and pressure, extent of secondary reactions, reaction time, etc.

The known process for modifying molecular sieves has the disadvantage that it involves the use of gaseous reactants, i.e. silane or diborane, which requires very careful and complex processing, in view of the hazards involved in handling these products.

Although these disadvantages of the known process can be overcome by specific measures, it would be highly preferable if a process of the above kind could be developed that does not require the use of the expensive and somewhat hazardous modifying agents.

In accordance with the present invention, there has been discovered a new procedure of modifying molecular sieves to alter their molecular sieving and adsorption selectivity properties.

This procedure includes dry mixing the molecular sieve with weak acids, salts or derivatives thereof, in combination with a thermal treatment. The molecular sieve can be modified in various ways, including:

1. dry mixing the molecular sieve and modifying agent, followed by thermal treatment, and
2. dry mixing the molecular sieve and modifying agent, followed by adding a liquid such as water and/or organic solvent, to form a slurry or paste, drying the mixture thus obtained, followed by thermal treatment as in 1.

In principle these methods either give a dry mixture, a slurry or a paste. Preference is given to the second method under conditions (liquid/molecular sieve ratio) that a paste is formed.

Afterwards the dry, solid mixture of molecular sieve and modifying agent undergoes a thermal treatment for several hours. A reaction between the molecular sieve and the modifying agent causes a change in the porosity and affinity of the molecular sieve.

The invention thus comprises a process for modifying a molecular sieve, whereby the molecular sieve is brought into contact with a modifying agent containing at least one weak acid, a salt of a weak acid or a derivative of a weak acid of at least one element of Groups III, IV or V of the Period Table of Elements, by dry mixing the molecular sieve and the modifying agent, optionally followed by adding liquid to form a slurry or paste, whereafter the resulting mixture is subjected to a thermal treatment.

One of the advantages of this new process is the ease of manipulating both starting materials compared with the complex and dangerous silanation and/or boranation modification methods (explosion hazards). Because the process is based on a mixture of two compounds (determined by a simple gravimetric measurement) the usual upscaling problems do not occur. Also the homogenity of the modified sample can be controlled independently of the amount of treated zeolite. Typical of this new procedure of modifying of molecular sieves is the ease for the industrial use and the favoured economical application without very high pretreatment and installation costs and the absence of process hazards. More in particular the present invention has the advantage of very good reproducibility.

It is remarked that for a suitably good result the dry mixing step is essential. It is remarked, that the known methods for increasing the acid resistance of the molecular sieve by impregnation with an aqueous solution to prepare a coating on the molecular sieve do not give the good results obtained with the process of the present invention.

The chemical modifications with hydrides (diborane and silane) require OH-groups and are generally carried out only on H-form molecular sieves. With this new process of modification however, all types of cation-form molecular sieves can also be used.

Because the molecular sieves have been contacted with a modifying agent and thermally treated, the compounds formed in the channels and cages influence the molecular sieving and the selective adsorption characteristics of the substrates. The resulting sorption behaviour depends on the nature of the introduced obstructions, their location and interaction with the molecular sieve. Therefore a mechanism has been proposed to elucidate the observed adsorption properties in the case of boric acid. When a molecular sieve has been contacted with boric acid ($H_3BO_3$), the boric acid will polymerise during the thermal treatment to boron-oxides. By changing, for example the amount of added boric acid or the degree of polymerization, it is possible to change the adsorption behaviour of the zeolite in a controlled way. Hydroxyl groups inside the channels of a molecular sieve, if any, may react with boron hydroxyl groups when they are heated. By fusing boric acid one forms first gaseous metaboric acid and later boron oxides according to:

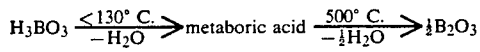

The metaboric acid undergoes several other transitions resulting in its α-, β- or -65 -form.

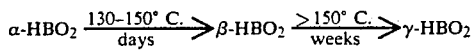

The metaboric acid will enter the zeolite and the pores and can dimerize

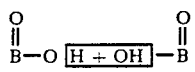

Also in the zeolite pores a reaction with hydration water is possible.

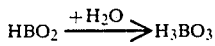

At elevated temperature, polymerization between neighbouring boron hydroxyl groups is possible with the removal of $H_2O$.

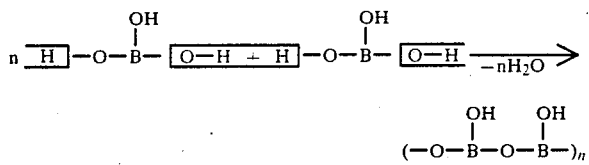

This should lead to a network of linked boron-oxygen compounds inside the pores of the molecular sieve. The types of formed, polymerized compounds depend on the molecular sieve network and on the forms characteristic for metaboric acid (namely α-, β- or -65 -form).

Further dehydration results in the formation of boron-oxides, polymerized inside the structure of the molecular sieve. Finally, cross-linked metaborates and boron-oxides will be present in the molecular sieve pores, strongly affecting the molecular sieving and selective adsorption properties.

The other modifying reagents used, concerning this new procedure, are believed to act in a similar way. The molecular sieves are modified by the same manipulations based on a mixing of compounds and a thermal treatment. The high temperatures induce also the formation of different polymerized oxides compounds inside the channels of the molecular sieves. These implanted compounds act as obstructions and change the gas-substrate interactions compared with the original, unmodified sample.

The contact between molecular sieve and the modifying agent, can be carried out in a number of ways:

1) dry mixing molecular sieve and modifying agent and 2) dry mixing as in 1) followed by adding liquid such as water and/or organic solvent, to form a slurry, or paste and afterwards drying.

In all embodiments the molecular sieve that has been brought into contact with the modifying agent (the mixture) is subsequently subjected to a thermal treatment at a temperature of at least 250° C.

In the case said mixture still contains free and/or bound solvent it is subjected to a drying and/or activating step in order to remove free and/or bound solvent, previous to the thermal treatment. This drying and/or activating step can be carried out at reduced pressure, for example to prevent decomposition of organic solvent or to facilitate the removal of solvent. It is not necessary that the steps of drying and/or activating on the one hand and thermal treatment on the other, are clearly distinguishable from each other, for example by intermediate cooling.

An important aspect is that if there is free liquid present in the mixture, the temperature is raised above the boiling point of the used solvent at the pressure applied, with an upper limit of 200° C. In the case of water it is preferred to dry the mixture at a temperature between 50 and 110° C., until all water has been evaporated.

Thereafter the temperature is increased to a value above 250° C. for a period of time sufficient to obtain the required polymerization of the modifying agent. The time for this ranges from 0,5 to 24 hours or more, whereas the temperature can be between 250° C. and 750° C. Shorter times or lower temperatures tend to give insufficient results, whereas longer times do not give additional advantages. The same applies to higher temperatures, whereby one should be careful to avoid that too much modifying agent becomes gaseous, or that the molecular sieve structure collapses.

The molecular sieves to be treated in accordance with the invention can be any natural or synthetic molecular sieve or zeolite. Zeolites and molecular sieves are known in the art and can suitably be defined as product with a crystallized microporous structure, such as crystalline alumino silicates with an Si/Al molar ratio of 1 to 100, preferably 1-20. Examples are mordenite SP and LP, zeolite A, X and Y, ZSM-5, clinoptilolite, ferrieriete, silicalite, erionite, chabazite, etc. in H- or cation form. It is also possible to use a molecular sieve that contains metal species.

The modifying agent must be capable of forming polymerized structures in the molecular sieve and is of inorganic nature. These requirements are fullfilled by weak acids of the elements of Group III. IV and V of the Periodic Table, as well as the salts and derivatives thereof. These weak acids usually have the structure $H_a E_b O_c$, wherein H and 0 stand for hydrogen and oxygen respectively, and E is the said element. a, b and c are such that the structure is neutral. Salts thereof, such as with Na, K, Ca, Al, $NH_3$, etc. can also be used. Suitably the modifying agent is chosen from the group of boric acid, silicic acid, acids of phosphor and salts thereof, more in particular it is $H_3BO_3$, $NaH_2PO_2$. $Na_4P_2O_7.10H_2O$, $K_3PO_4$, $(NH_4)_2HPO_2$, $Na_2B_4O_7.10H_2O$ and Si-$(OH)_4$ It is also possible to use derivatives of the weak acids, such as acid halides.

The amount of modifying agent can vary within wide ranges and is mainly determined by the degree of modification that is required. Preferred ranges of the weight ratio of molecular sieve to modifying agent are between 100:1 and 1:1, more in particular 10:1 to 3:1. These ratio applies to the amount of molecular sieve and the amount of dry modifying agent, not taking into account any liquid that can be used in the process. The amount of liquid is of influence on the results obtained.

Generally the ratio of liquid (if used) to modifying agent ranges from 400:1 to 1:20. Preferably the ratio of liquid, more in particular water, to molecular sieve ranges from 2 to 0.25, whereby the ratio of 1.25 to 0.8 is especially preferred. The reason for this preference lies therein, that within these ratios the best results are obtained. Higher amounts of liquid than twice the amount of molecular sieve can be used, but do not give any added advantages.

The modified molecular sieve can be used for various purposes. It is possible to apply it as a catalyst for chemical reactions, optionally after the outer surface has been made inert. Another application is the separation or storage of gases. The modified molecular sieves can also be used as selective ion exchangers in liquids, or to purify liquids.

The invention will now be elucidated on the basis of some examples.

EXAMPLE 1

3 grams of the parent sample, Ca A from Ethyl Company, were dehydrated at 370° C. in vacuum overnight. The adsorption kinetics of $CH_4$ were investigated at 0° C. (FIG. 1). 3 grams of this parent sample (particle size $<150/\mu m$) were mixed with 0.15 grams boric acid powder. After adding 3 ml of water the mixture was stirred during a few minutes, dried at 105° C. in air for 1 hour and heated for 2 hours at 400° C. in air. 2 grams of this modified sample were dehydrated overnight in vacuum at 368° C. As shown in FIG. 1 one observes a decrease in the adsorption capacity for $CH_4$ at 0° C.

EXAMPLE 2

Figure 2:
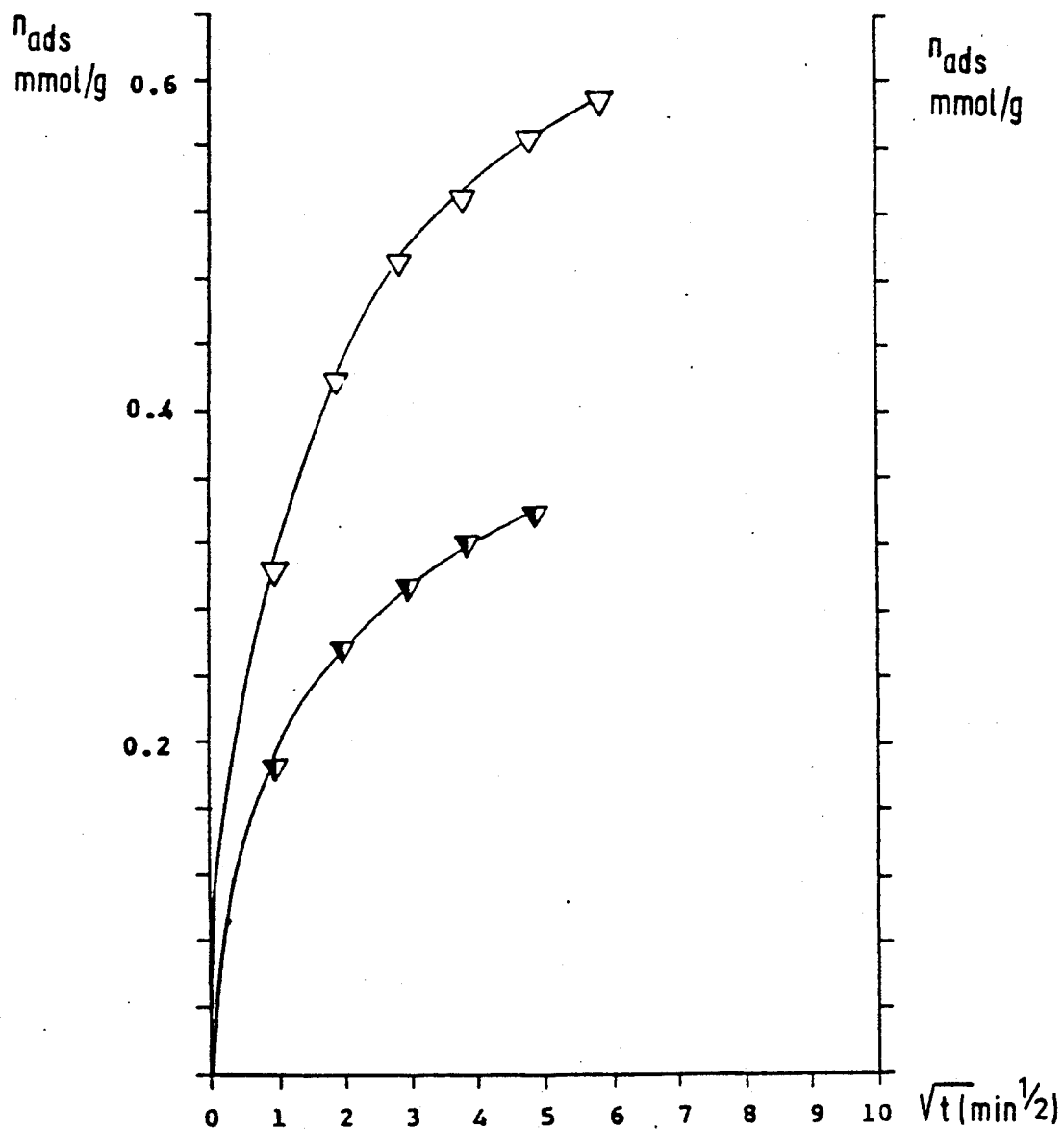

2 grams of Na-mordenite SP (E127Nam 543:SCGP) were outgassed overnight at 420° C. in high vacuum and tested for its adsorption behaviour. The sorption characteristics for Kr at 0° C. are shown in FIG. 2. 3 grams of the parent sample (fraction $<150/\mu m$) were mixed with 0.15 g powdered boric acid and stirred with 3 ml $H_2O$ for a few minutes at room temperature. Then the sample was thermally treated for 1 hour at 110° C. and for 2 hours at 400° C., both in air. 2 g of this modified sample were dehydrated at 450° C. overnight in vacuum to investigate the sorption behaviour for Kr. FIG. 2 shows a capacity decrease for said gas.

EXAMPLE 3

Figure 3:
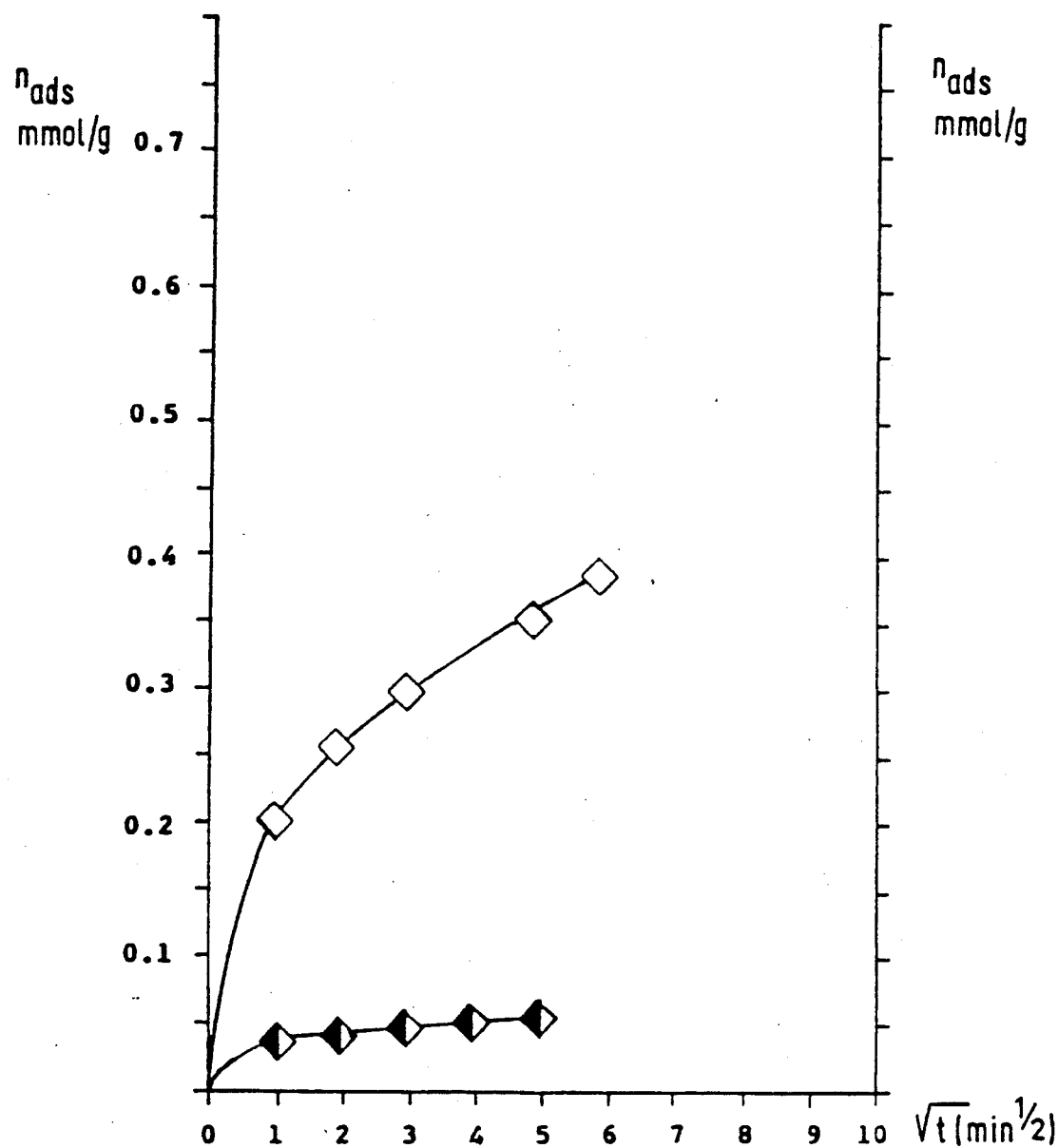

2 g of the parent sample, CaM CM782 (SCGP, extrudates) were dehydrated in vacuum overnight at 450° C. FIG. 3 shows the observed sorption characteristics for Xe at 0° C. No equilibrium was observed after 25 min. 3 g of the parent sample (fraction $<150/\mu m$) were mixed with 0.15 g boric acid powder and stirred with 3 ml $H_2O$ at room temperature. Afterwards, the sample was thermally treated for 1 hour at 105° C. and for 2 hours at 400° C., both in air. 2 g of this sample were dehydrated overnight at 454° C. in vacuum to study the adsorption kinetics of Xe. FIG. 3 shows a capacity decrease.

EXAMPLE 4

Figure 4:
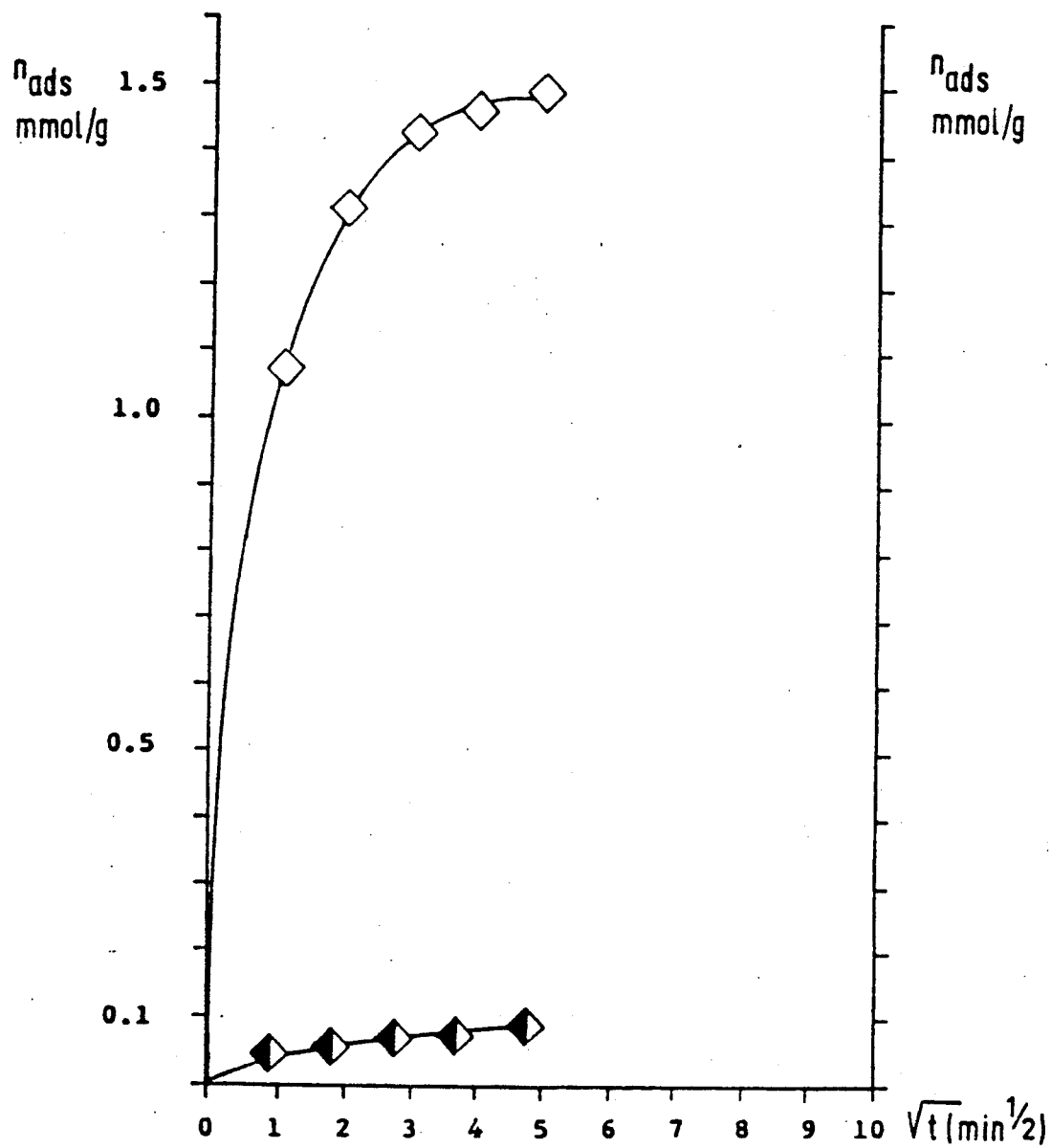

50 g of E127NaM 543 from SCGP were exchanged for $Ba^2$ with 65 g of $Ba(NO_3)_2$ into 1 l of water at room temperature during 1 night. 2 g of this batch were outgassed overnight in vacuum at 450° C. and tested for its adsorption behaviour with Xe at 0° C. (FIG. 4). The adsorption of Xe after 25 min is 1.473 mmol/g. 3 g of the parent sample were mixed with 0.15 g powdered boric acid and stirred with 3 ml $H_2O$ at room temperature. Afterwards the sample was heated for 1 hour at 110° C. and for 2 hours at 400° C., both in air. 2 g of this treated sample were dehydrated at 450° C. overnight in vacuum. As shown in FIG. 4 the decrease in adsorption capacity for Xe was important. The sorption value of Xe after 25 min is only 0.079 mmol/g.

EXAMPLE 5

Figure 5:
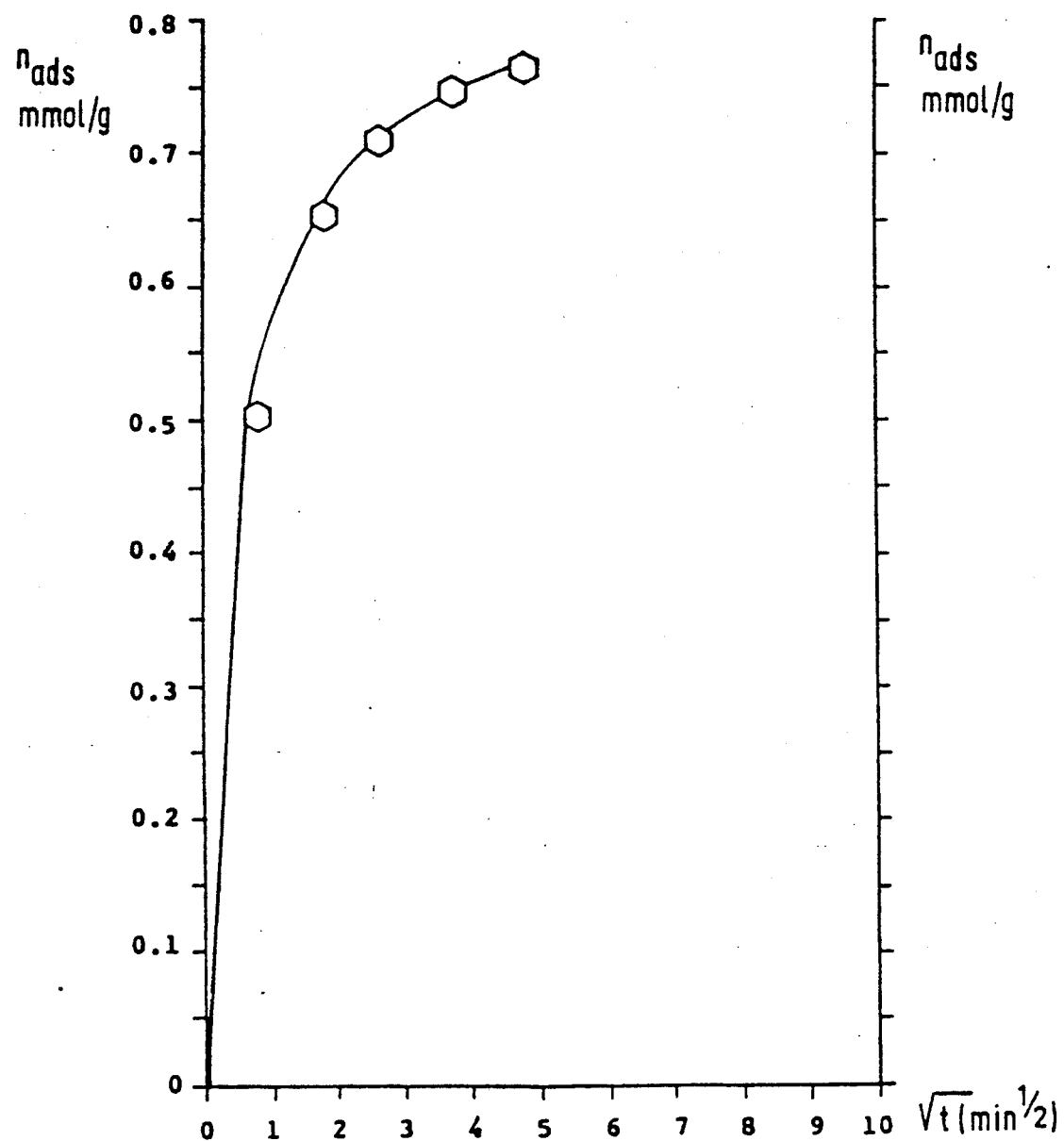

2 g of the parent sample, CaM CM782 (SCGP, extrudates) were dehydrated in vacuum overnight at 450° C. The adsorption behaviour of this sample was tested for $CH_4$ at 0° C. (FIG. 5).

Figure 6:
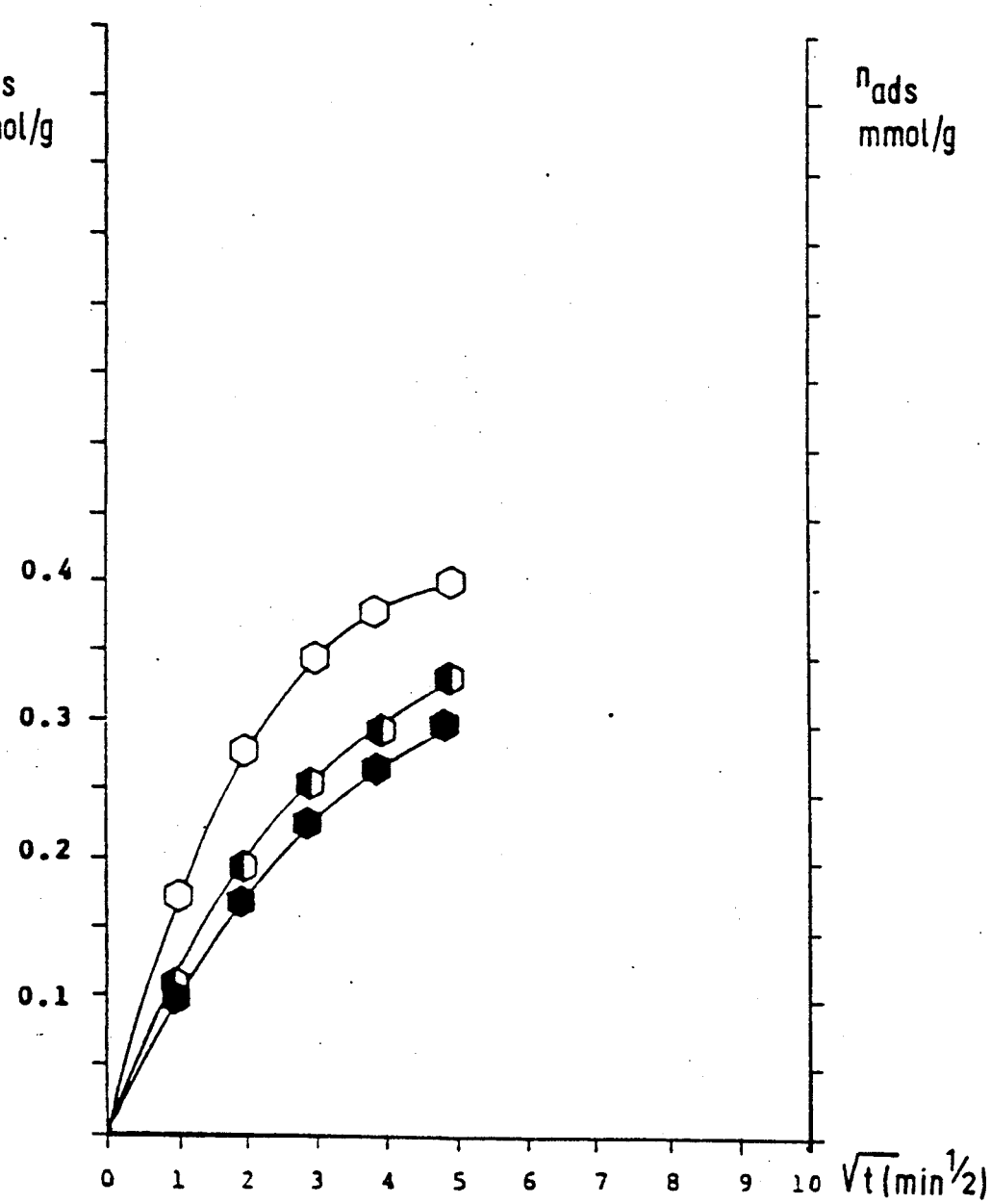

A. Particle size $>800/\mu m$ 3 g of the parent sample (fraction $>800/\mu m$) were mixed with 0.15 g $H_3BO_3$ - powder. After adding 3 ml of $H_2O$, the slurry was mixed and dried during 1 hour at 105° C. in air. The dried sample was heated at 400° C. for 2 hours in air. 2 g of this modified sample were dehydrated at 463° C. overnight in vacuum. FIG. 6 shows the kinetic runs of $CH_4$ at 0° C. One observes a decrease in the sorption capacity.

B. Particle size $250-800/\mu m$ 3 g of the parent sample (fraction $250-800/\mu m$) were mixed with 0.15 g $H_3BO_3$-powder. Afterwards 3 ml of $H_2O$ was added and the slurry was mixed and dried during 1 hour at 105° C. in air. The dried sample was heated at 400° C. for 2 hours in air. 2 g of this modified sample were dehydrated at 450° C. overnight in vacuum. The adsorption kinetics of $CH_4$ are shown in FIG. 6. Compared to the modification with a fraction $>800/\mu m$, one observes a lower sorption capacity.

C. Particle size $<150/\mu m$ 3 g of the parent sample (fraction $<150/\mu m$) were mixed with 0.15 g $H_3BO_3$-powder. After adding 3 ml of $H_2O$, the slurry was mixed and dried during 1 hour at 105° C. in air. The dried sample was heated at 400° C. for 2 hours in air. 2 g of this sample were dehydrated at 454° C. overnight in vacuum.

FIG. 6 shows the kinetic runs of $CH_4$ at 0° C.

EXAMPLE 6

The parent sample used in this example was E127-NaM 543 treated with an aqueous $KNO_3$ solution. The $Na^+$-ions were exchanged for $K^+$-ions using 100 g $KNO_3$ and 50 g sample E127 in 0.5 l of $H_2O$ for 1 night at room temperature.

Figure 7:
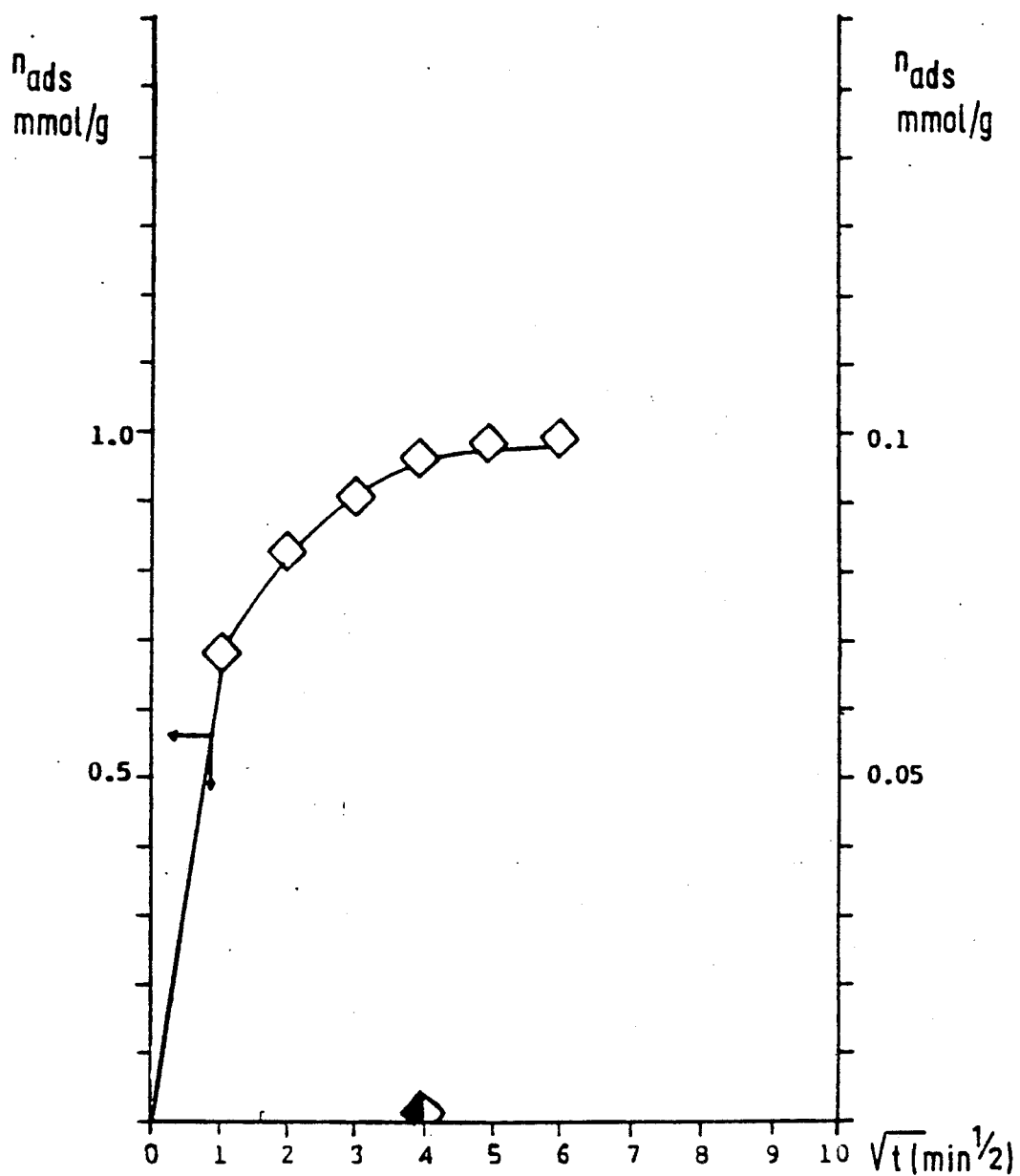

2 g of this exchanged sample (extrudates) were dehydrated in vacuum at 435° C. overnight. The adsorption behaviour was tested for Xe at 0° C. (FIG. 7). An equilibrium situation was reached after 36 min.

2 g of the parent sample (fraction $250-800/\mu m$) were mixed with 0.2 g $K_3PO_4$ dry. Then 2 ml of $H_2O$ were added and mixed. The sample was first dried during 1 hour at 100° C. in air and afterwards treated at 500° C. for 2 hours in air. After dehydration the adsorption characteristics were investigated (FIG. 7). Xe was excluded.

EXAMPLE 7

Figure 8:
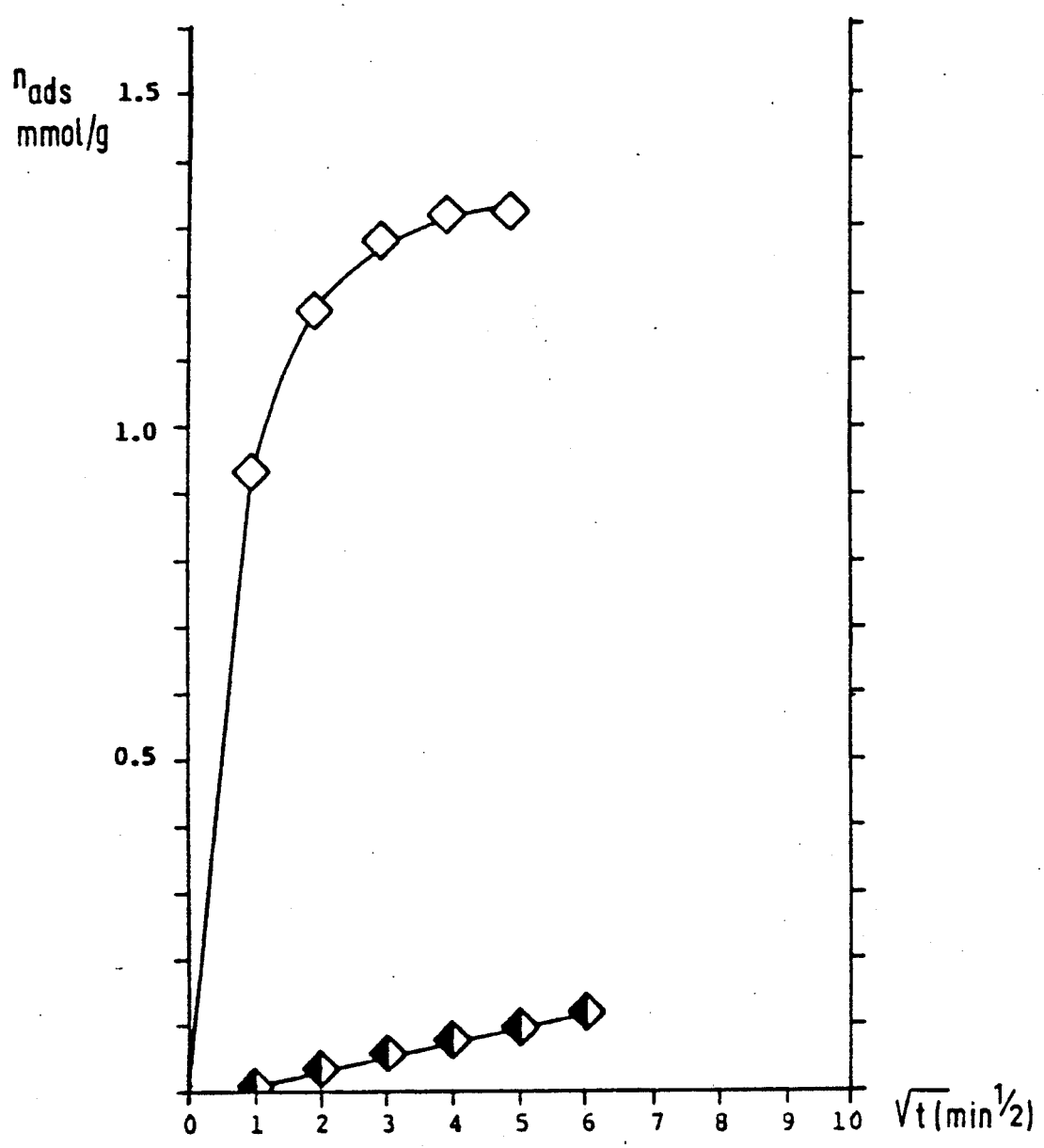

2 g of the parent sample, E126NaM 543, were dehydrated at 440° C. for one night in vacuum. The kinetic runs of Xe were investigated at 0° C. (FIG. 8). An equilibrium situation is reached after 25 min and it shows a high adsorption capacity. 3.1 g of the parent sample (fraction $<150/\mu m$) were mixed with 0.3 g $(NH_4)_2HPO_4$. After mixing with 3 ml of $H_2O$ the substrate was dried at 100° C. in air. A thermal treatment of 2 hours at 500° C. in air was the next experimental manipulation before dehydrating the sample in vacuum at 455° C. overnight. The adsorption of Xe was again investigated on this modified sample at 0° C. The modified sample shows a decrease in the adsorption capacity, but especially a strong diffusion-controlled sorption process for Xe at 0° C. (FIG. 8).

EXAMPLE 8

Figure 9:
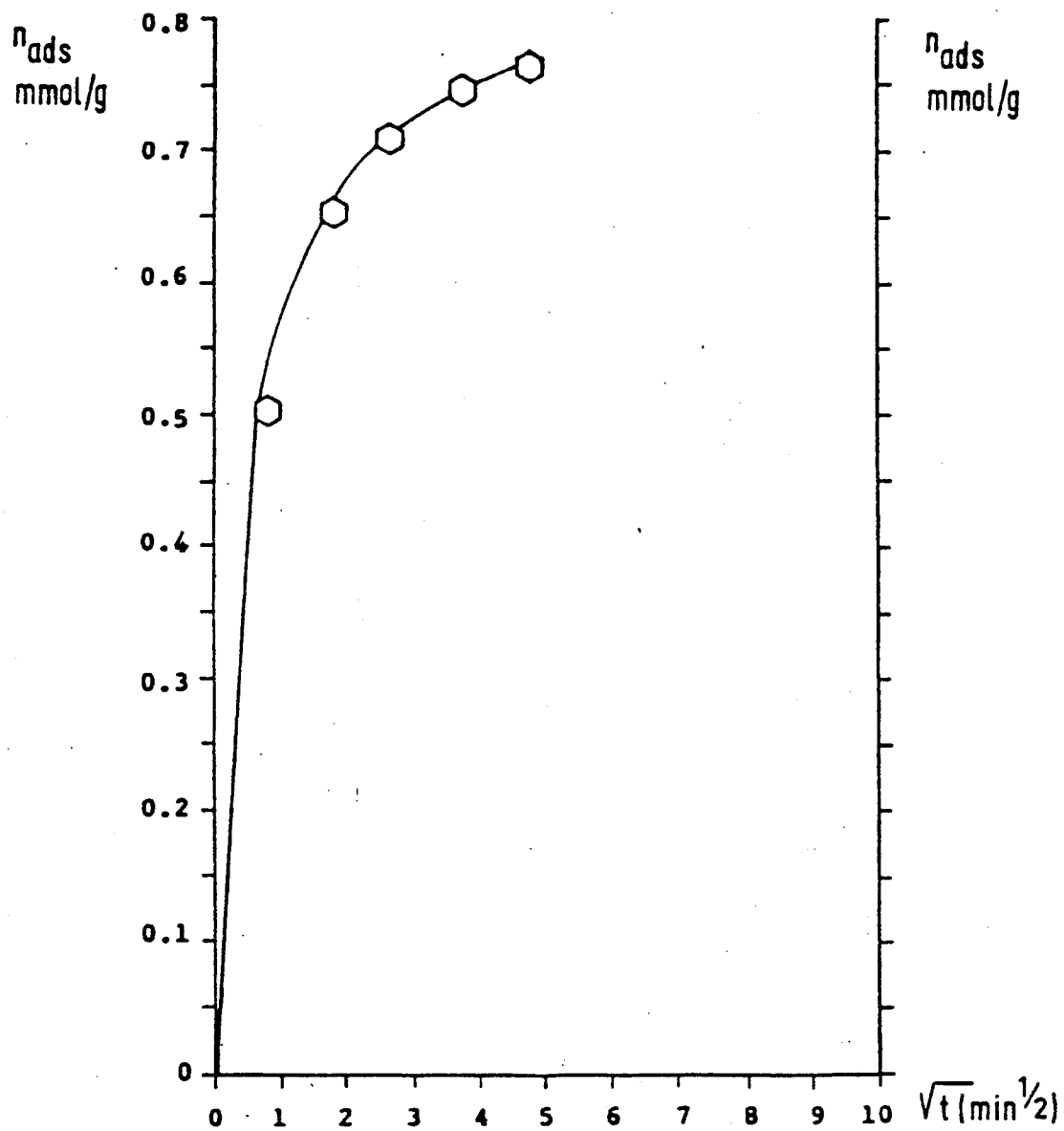

2 g of the parent sample. CaM CM782 (SCGP, extrudates), were dehydrated in vacuum overnight at 450° C. FIG. 9 shows the observed sorption characteristics of $CH_4$ at 0° C. 3 g of the parent sample (fraction $<150/\mu m$) were mixed with 0.075 g $H_3BO_3$ (2.5% weight) and stirred with 3 ml of $H_2O$ at room temperature. Then the sample was evaporated for 1 hour at 100° C. in air and thermally treated for 2 hours at 400° C. also in air.

Figure 10:
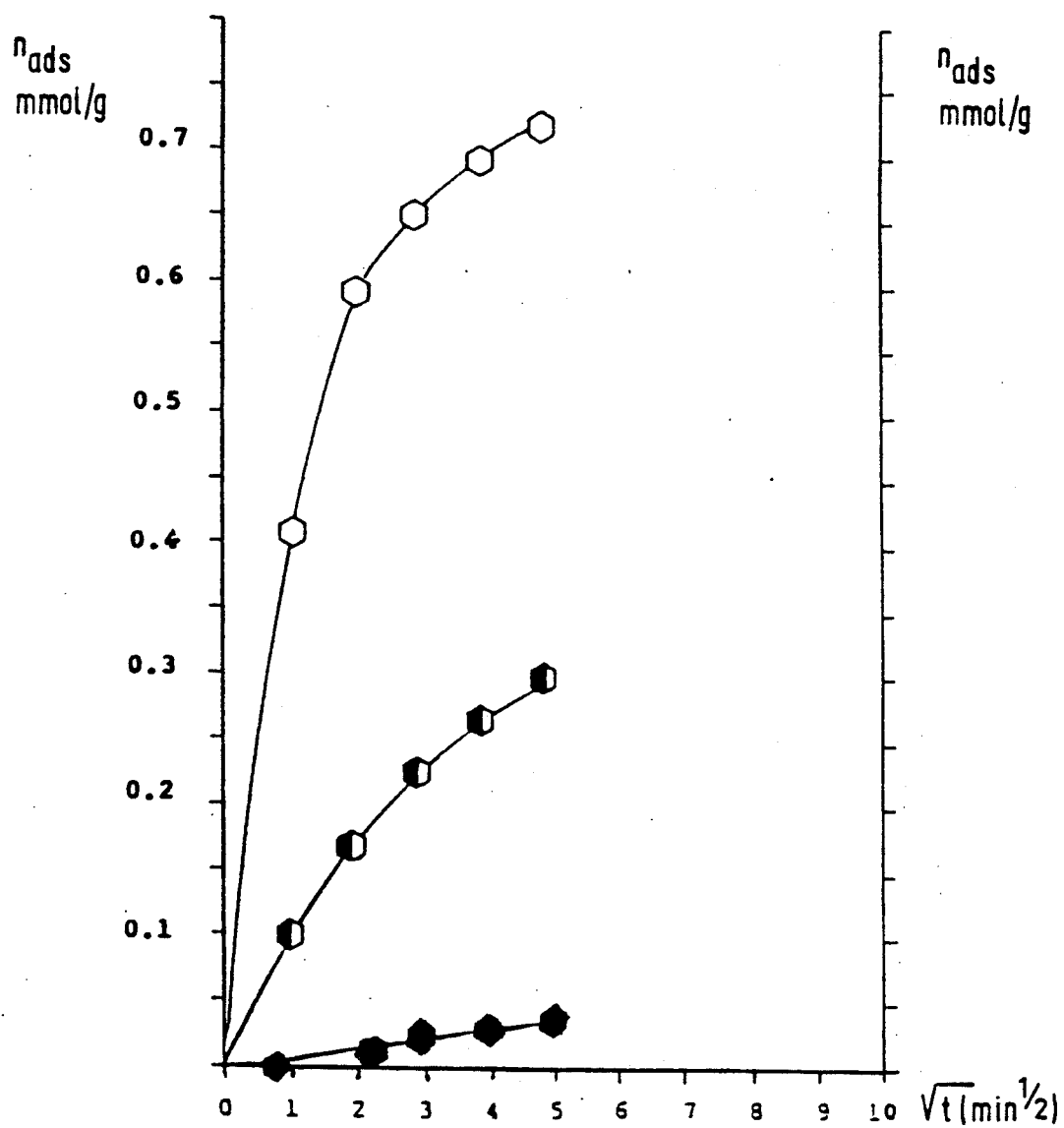

2 g of this modified sample were dehydrated overnight at 457° C. in vacuum. FIG. 10 shows a decrease in the adsorption of $CH_4$ at 0° C. after modification.

EXAMPLE 9

3 g of the parent sample (cfr. Example 8 (fraction $<150/\mu m$) were mixed with 0.15 g $H_3BO_3$ (5% weight) and stirred with 3 ml of $H_2O$ at room temperature. Afterwards the sample was thermally treated for 1 hour at 100° C. and for 2 hours at 400° C. both in air.

2 g of this treated sample were dehydrated overnight at 454° C. in vacuum.

At this modified degree one observes for $CH_4$ a larger capacity decrease compared to that in Example 8 (FIG. 10).

EXAMPLE 10

3 g of the parent sample (cfr. Example 8) (fraction $<150/\mu m$) were mixed with 0.3 g $H_3BO_3$ (10% weight) and stirred with 3 ml of $H_2O$ at room temperature. Afterwards, the sample was thermally treated for 1 hour at 100° C. and for 2 hours at 400° C., both in air. 2 g of this treated sample were dehydrated at 455° C. overnight, to investigate the kinetic run of $CH_4$ at 0° C. (FIG. 10). With this modification $CH_4$ shows at this adsorption temperature not only an enormous capacity decrease but the adsorption is also strongly diffusion-controlled.

EXAMPLE A (comparative)

The parent sample used in this experiment was CaM CM782 (SCGP; extrudates).

Figure 11:
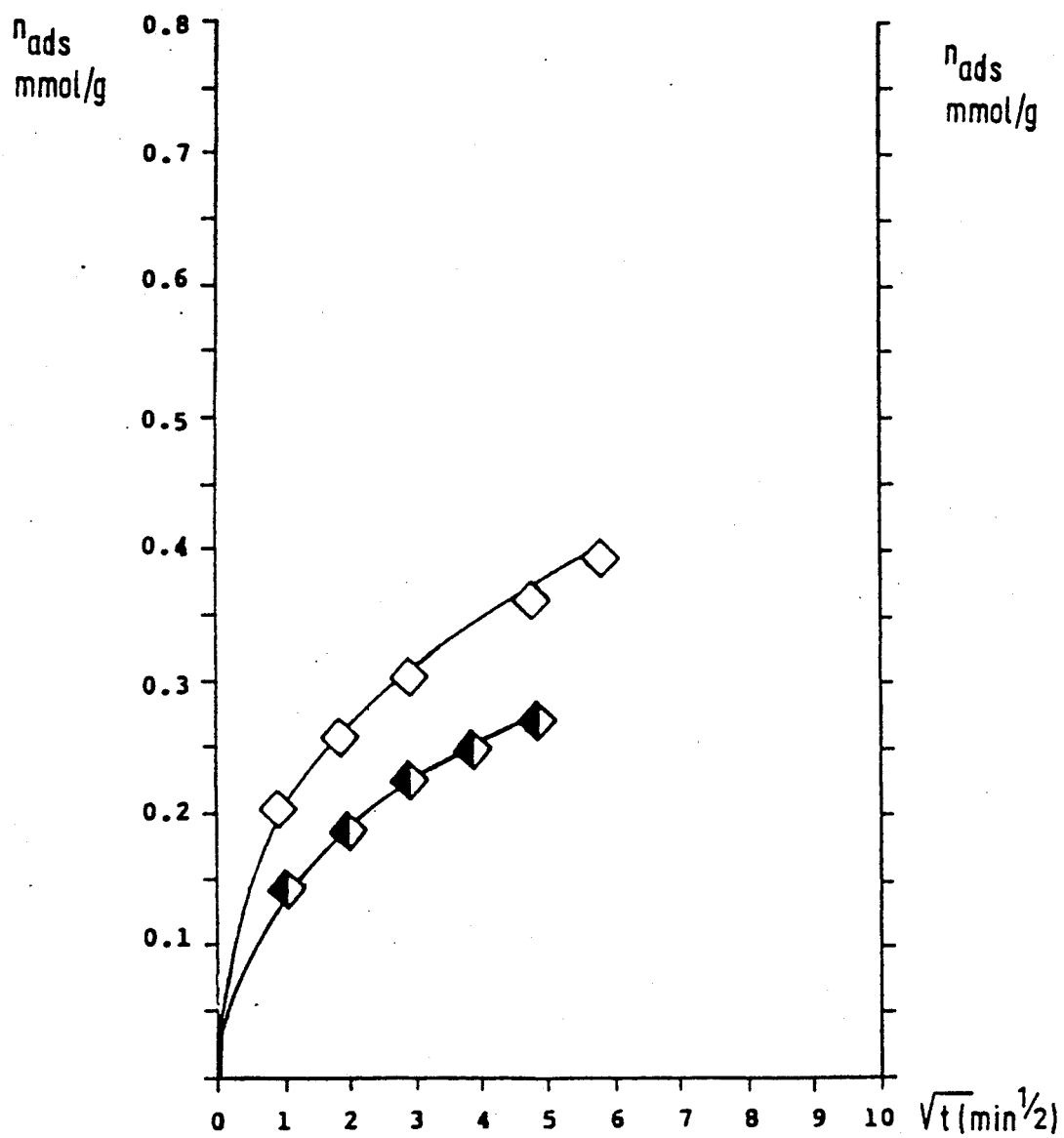

2 g of the sample were dehydrated overnight at 450° C. in vacuum in order to investigate its adsorption behavious. FIG. 11 shows the sorption kinetics of Xe at 0° C. 3 g CaM CM782 (fraction $<150/\mu m$) were treated for 1 hour and 30 min at 90° C. in a $H_3BO_3$-solution (0.15 g $H_3BO_3$ in 40 ml $H_2O$). After cooling to room temperature the residual solution was decanted and the sample was dried at 60° C. in air. The dried material was thermally treated for 2 hours at 400° C. in air.

2 g of this modified substrate were dehydrated at 449° C. overnight in vacuum. The kinetic run of Xe at 0° C. was investigated on the modified sample (FIG. 11). One observes only a small capacity decrease.

EXAMPLE 11

Parent sample : same as in Example 10.

3 g of the parent sample (fraction $<150/\mu m$) were mixed with 0.15 g $H_3BO_3$ and stirred with 3 ml of $H_2O$ at room temperature. Afterwards the sample was thermally treated for 1 hour at 100° C. and for 2 hours at 400° C., both in air. 2 g of this treated sample were dehydrated overnight at 454° C. in vacuum.

Figure 12:
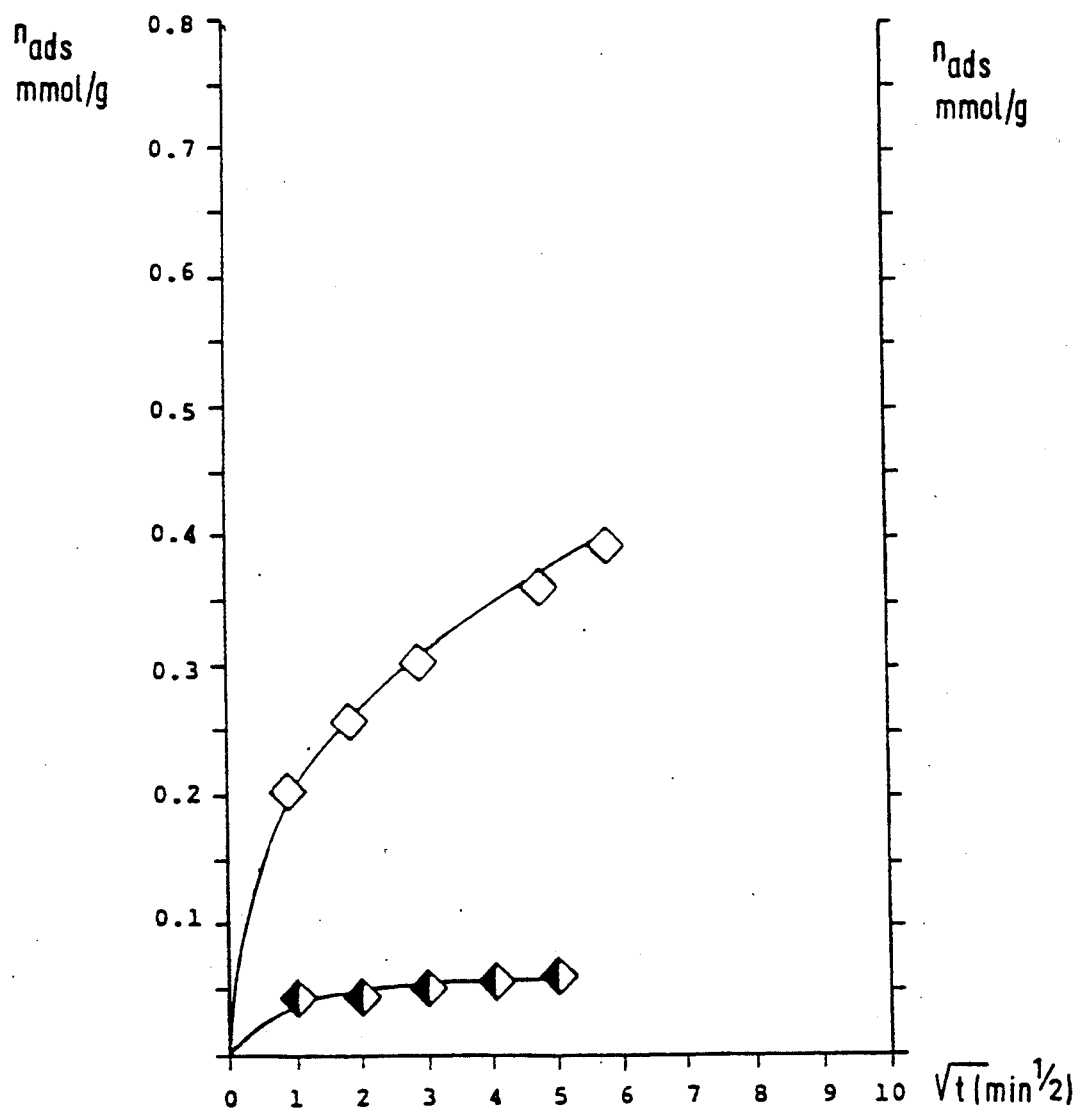

As shown in FIG. 12 the adsorption kinetics of Xe at 0° C. reveal a capacity decrease.

EXAMPLE 12

Figure 13:
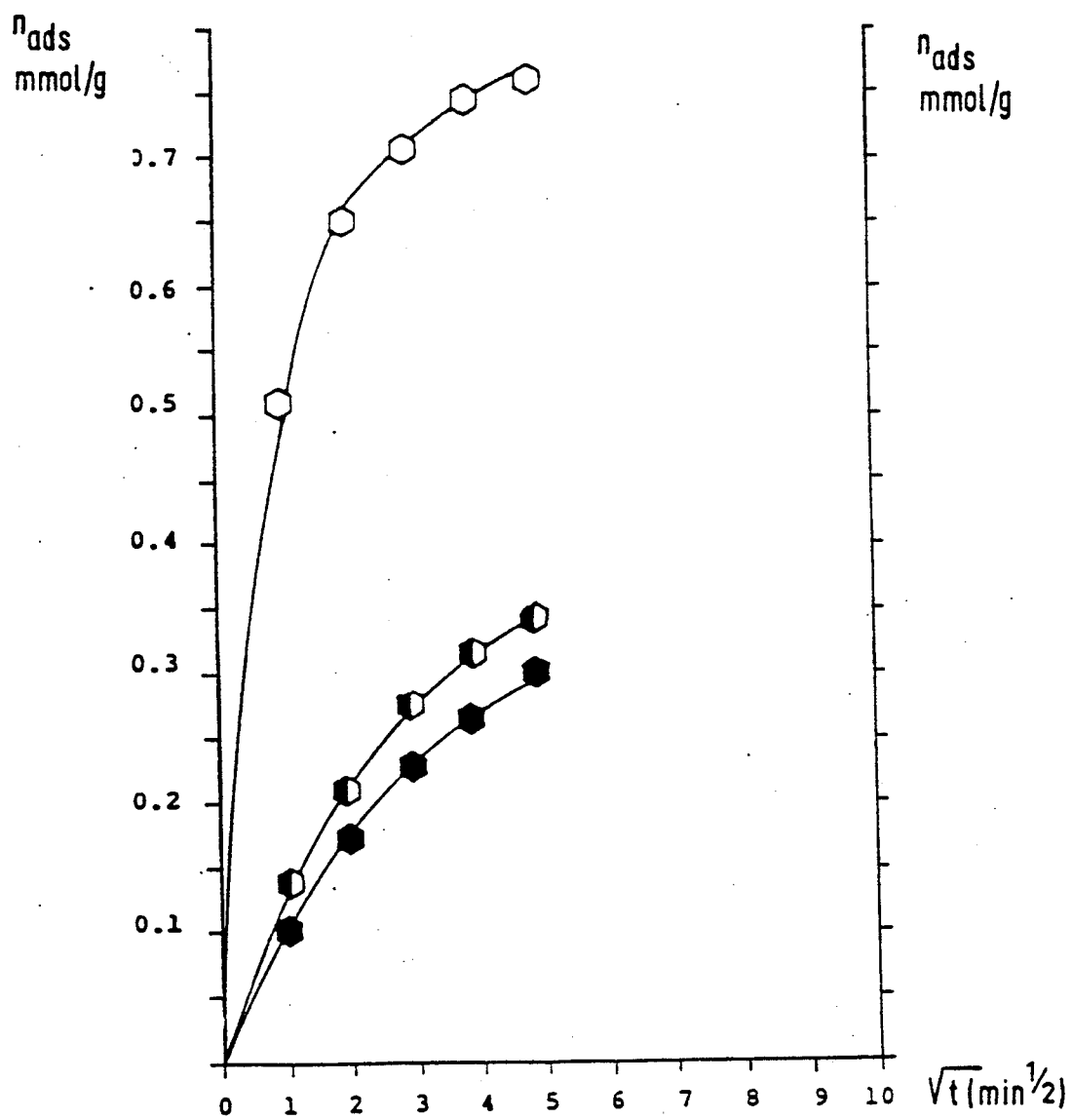

2 g of the parent sample CaM CM782 (SCGP, extrudates) were dehydrated overnight at 450° C. in vacuum. The kinetic runs of Xe and $CH_4$ at 0° C. were tested, both gases are still adsorbing after 25 min. The sorption value for $CH_4$ after 25 min is 0.762 mmol/g. (FIG. 13). (a) 3 g of the parent sample (fraction $<150/\mu m$) were mixed with 0.15 g powdered $H_3BO_3$ and stirred with 3 ml of $H_2O$ at room temperature. Afterwards the substrate was thermally treated for 1 hour at 100° C. and for 2 hours at 300° C., both in air. 2 g of this modified sample were dehydrated overnight at 444° C. in vacuum to investigate the adsorption behaviour for $CH_4$ at 0° C. (FIG. 23). The sorption value of $CH_4$ after 25 min is 0.351 mmol/g. (b) 3 g of the parent sample (fraction $<150/\mu m$) were mixed with 0.15 g $H_3BO_3$-powder and stirred with 3 ml of $H_2O$ at room temperature. Afterwards the substrate was thermally treated for 1 hour at 100° C. and for 2 hours at 400° C., both in air. 2 g of this modified sample were dehydrated overnight at 454° C. in vacuum. FIG. 13 shows a capacity decrease at 0° C. After modification the sorption value after 25 min of $CH_4$ is 0.303 mmol/g.

EXAMPLE 13

In this experiment the parent sample was CaM CM782 (SCGP, extrudates).

Figure 14:
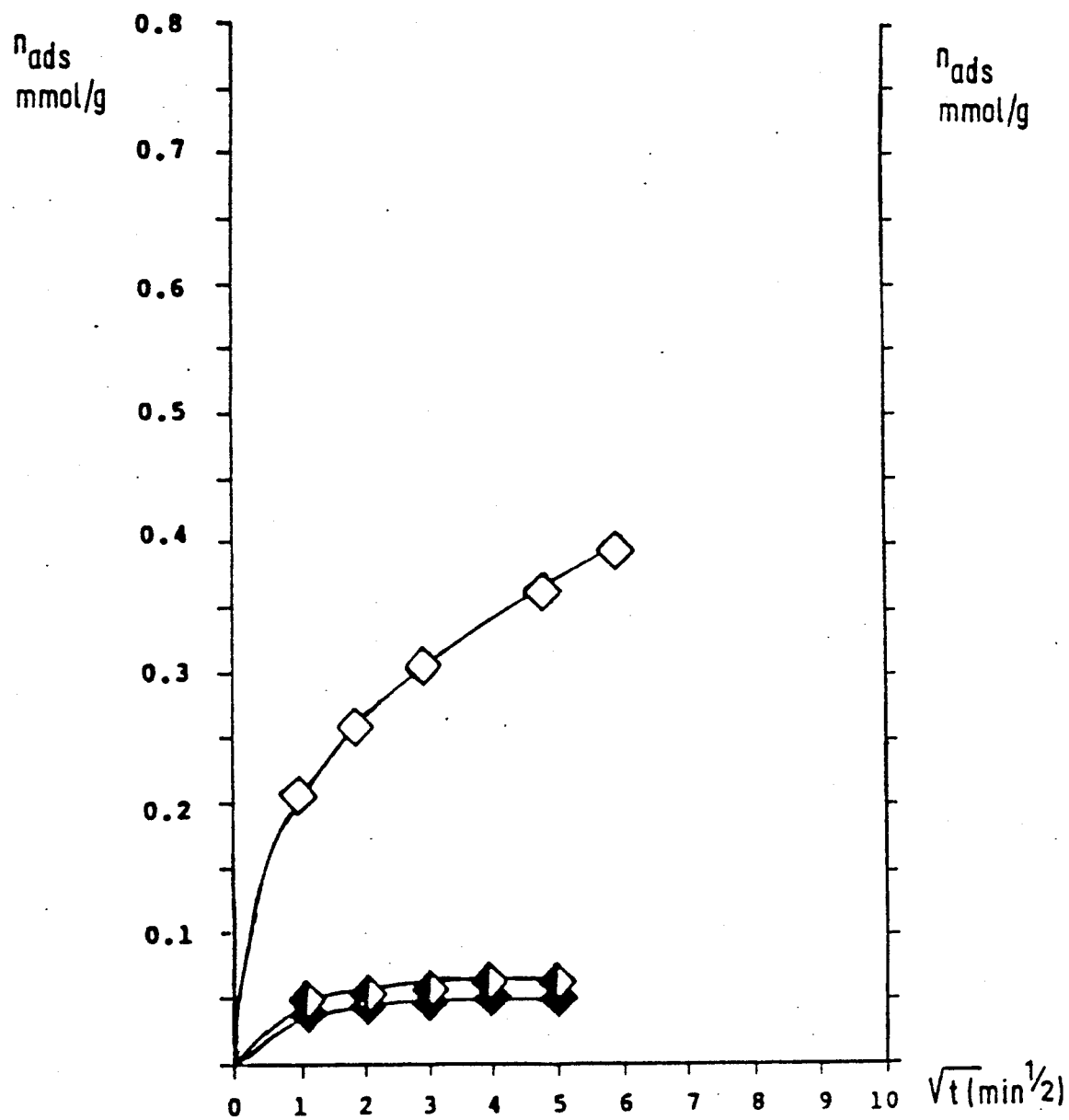

2 g of the parent sample were dehydrated overnight at 450° C. in vacuum to investigate its adsorption behaviour for Xe at 0° C. (FIG. 14).

(a) 3 g of the parent sample (fraction $<150/\mu m$) were mixed with 0.15 g $H_3BO_3$ and with 3 ml of water at room temperature. Afterwards the sample was thermally treated for 1 hour at 100° C. and for 30 min at 400° C., both in air. After a dehydration (overnight, at 444° C., in vacuum) of the sample the kinetic run of Xe at 0° C. were investigated (FIG. 14). A decrease of sorption capacity after the modification is observed.

(b) 3 g of the parent sample (fraction $<150/\mu m$) were mixed with 0.15 g $H_3BO_3$ and stirred with 3 ml of $H_2O$ at room temperature. Then the sample was thermally treated for 1 hour at 100° C. and for 2 hours at 400° C., both in air. 2 g of this modified sample were dehydrated at 454° C. overnight in vacuum. FIG. 14 shows the adsorption kinetics of Xe at 0° C. after the modification.

Comparing to Example 13 the sorption values of Xe are a little lower on this modified sample, due to the longer thermal treatment time.

EXAMPLE 14

Figure 15:
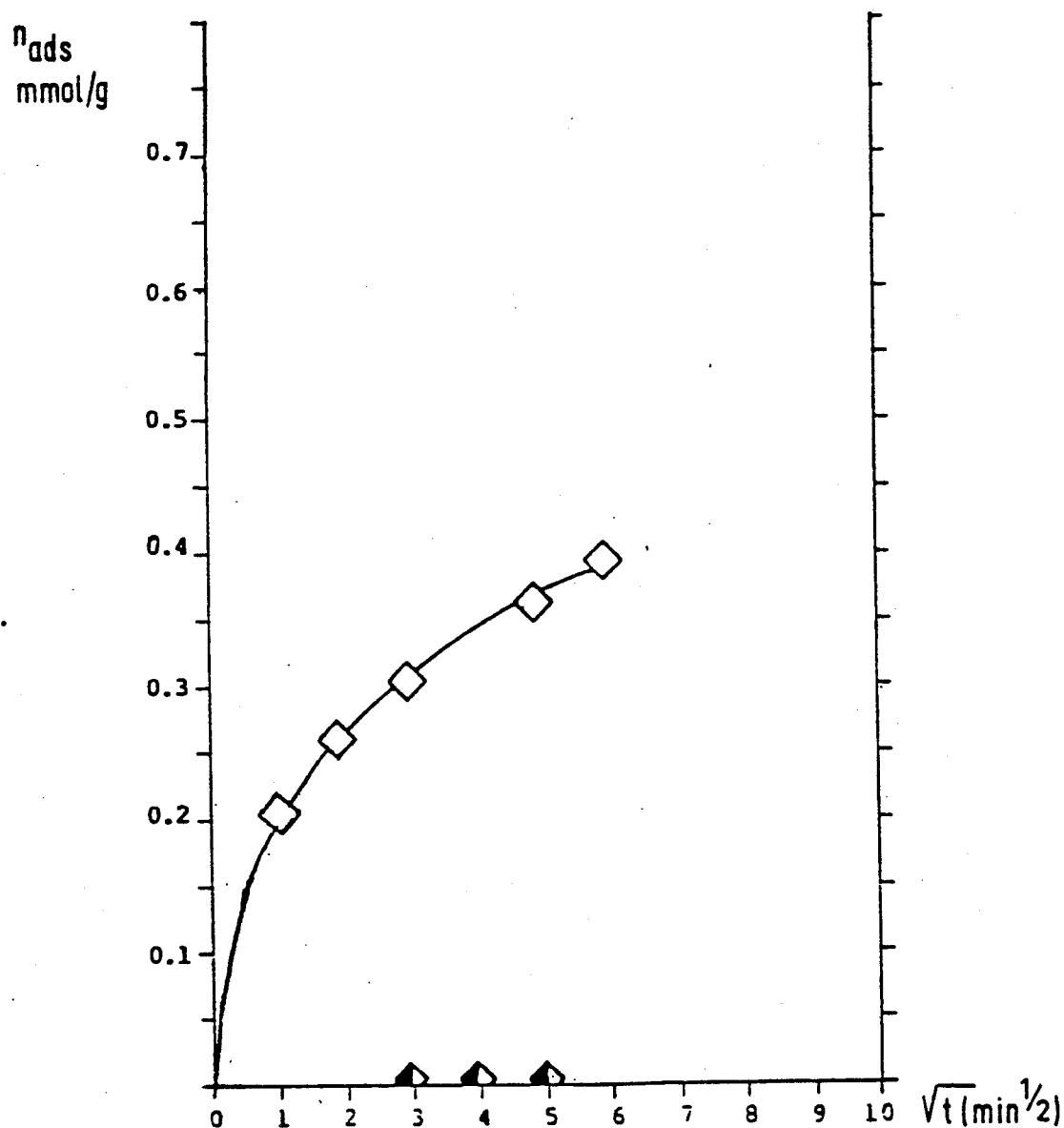

2 g of the parent sample, CaM CM 782 (SCGP, extrudates) were dehydrated overnight at 450° C. in vacuum. FIG. 15 shows the observed sorption characteristics for Xe at 0° C. After 16 min Xe is still adsorbing.

3.1 g of the parent sample (fraction <150/μm) were mixed with 0.3 g $H_3BO_3$ (10% weight) and stirred with 3 ml $H_2O$ at room temperature. Afterwards the sample was thermally treated for 1 hour at 100° C. and for 3 hours at 400° C., both in air. 2 g of this sample were dehydrated overnight at 427° C. in vacuum. FIG. 15 shows exclusion for Xe.

EXAMPLE 15

Figure 16:
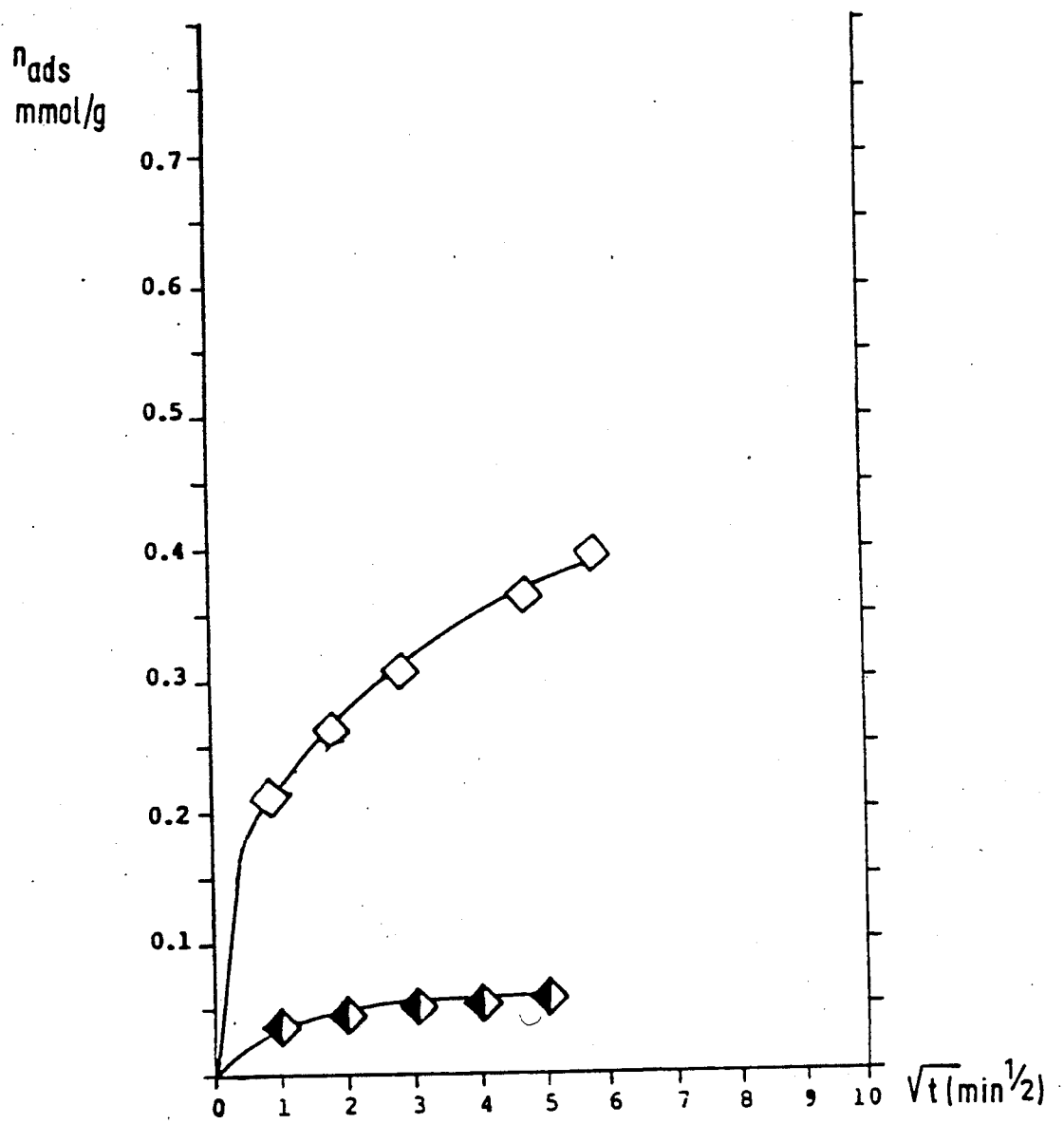

The parent sample, CaM CM782 (SCGP: extrudates) was dehydrated overnight at 450° C. in vacuum. FIG. 16 shows the observed sorption characteristics for Xe at 0° C. After 16 min Xe is still adsorbing.

3 g of the parent sample (fraction <150/μm) were mixed with 0.3 g $H_3BO_3$ (10% weight) and stirred with 3 ml $H_2O$ at room temperature. Afterwards the sample was thermally treated for 2 hours at 100° C. in air. The thermal treatment at 455° C. was carried out overnight in vacuum. FIG. 16 shows the obtained adsorption behaviour. A capacity decrease occurs with diffusion-controlled adsorption for Xe. The pore-narrowing of this sample is not so effective as the one in Example 14 although the same amount of boric acid was used.

EXAMPLE 16

Figure 17:
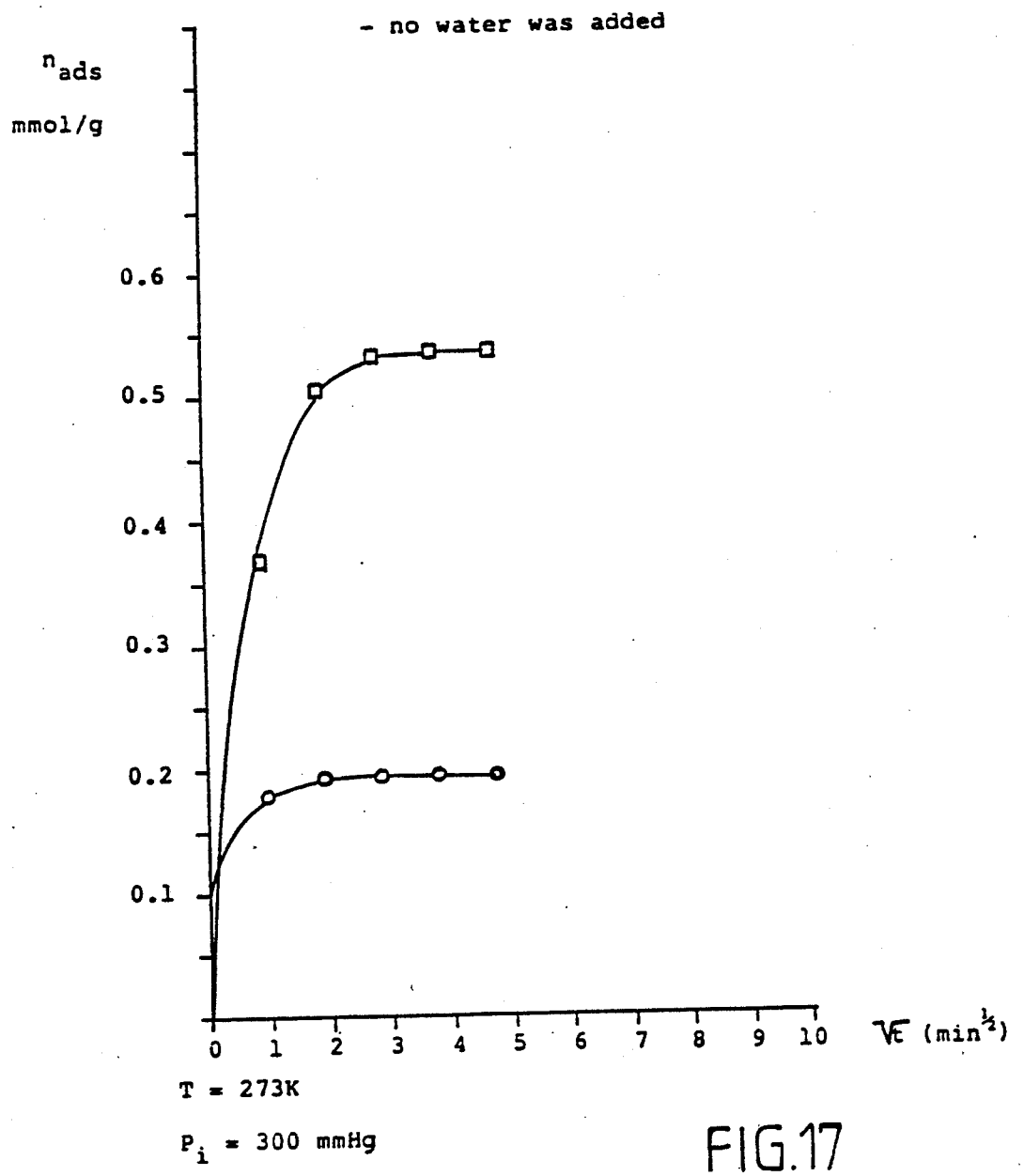
Figure 18:
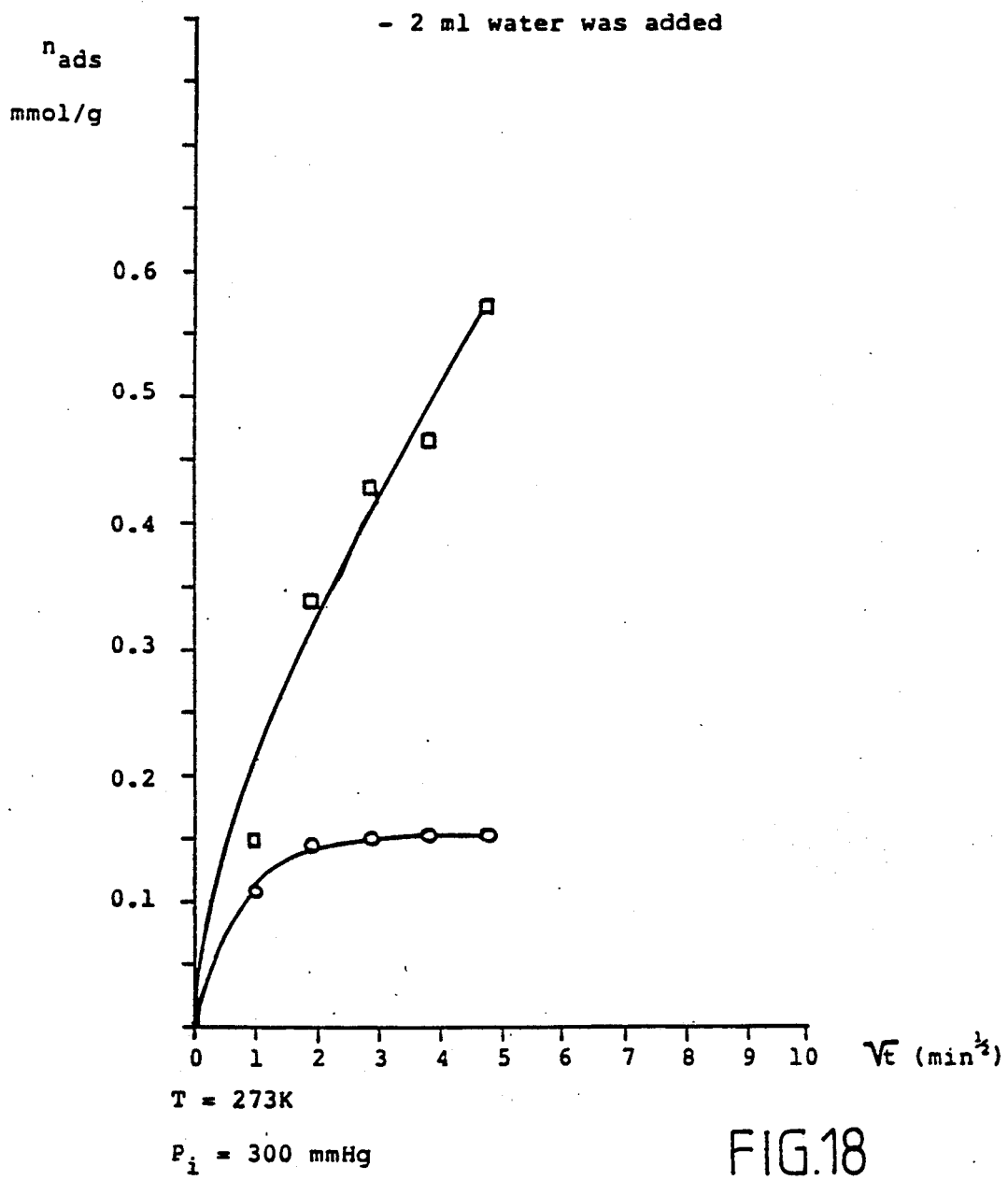
Figure 19:
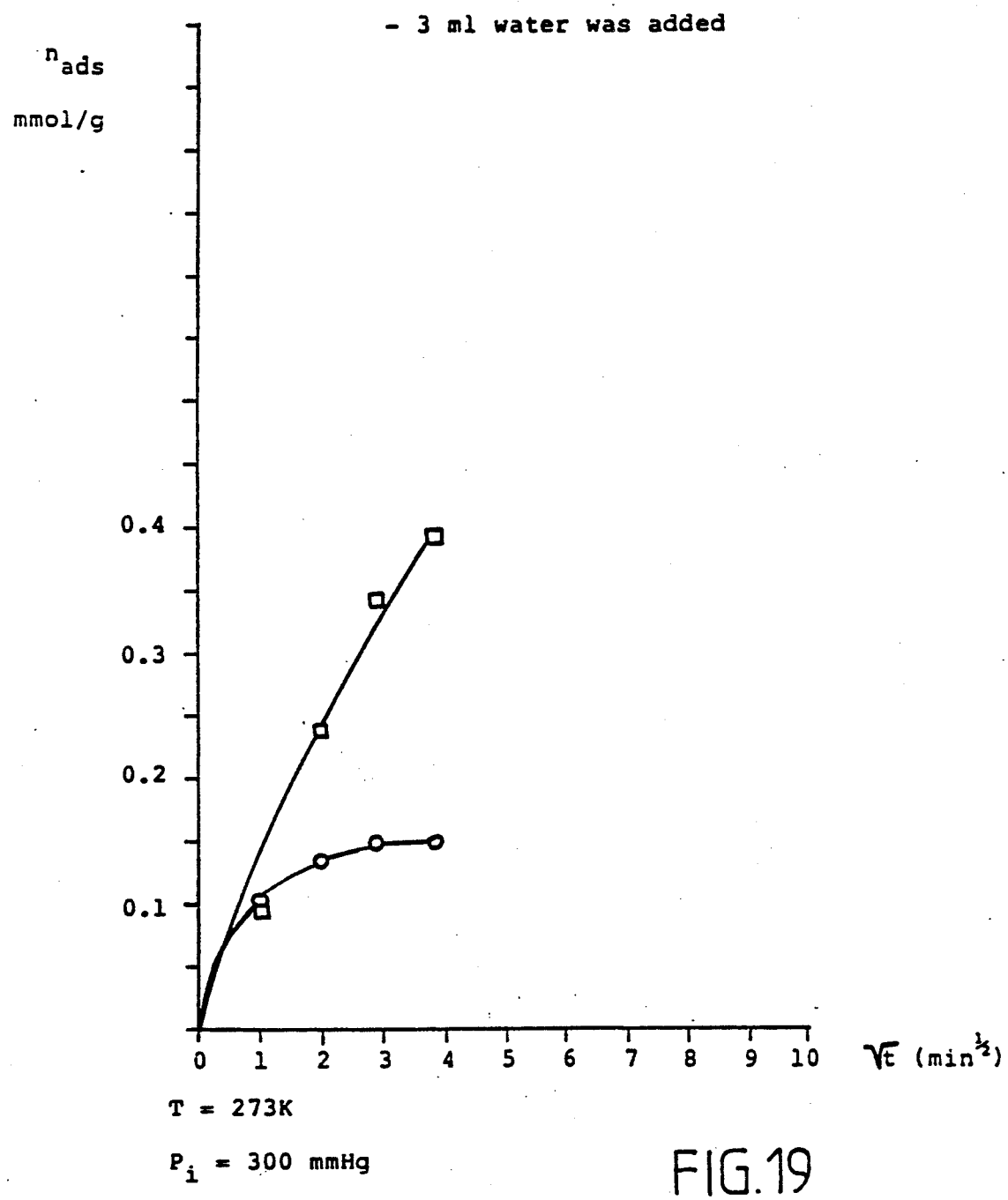

3 grams of the parent sample NH4-exchanged CM 790 were mixed with 0.9 grams dry $Na_2SiO_3.9H_2O$. Then 3 ml of $H_2O$ was added and the obtained slurry was mixed again. The sample was first dried during 1 hour at 100° C. in air and afterwards at 500° C. for 2 hours in air. The same procedure was used for the other samples. Instead of 3 ml $H_2O$; respectively no water and 2 ml of water were added to the mixture of zeolite and modifying agent. After dehydration (overnight, 450°, vacuum) of the modified samples, the adsorption characteristics were investigated for $N_2$ and $O_2$ at 0° C. as shown in FIGS. 17, 18 and 19. Increasing the amount of $H_2O$ introduces a diffusion-controlled adsorption especially for $N_2$.

We claim:

1. A process for modifying a molecular sieve, whereby the molecular sieve is brought into contact with a modifying agent containing at least one weak acid, a salt of a weak acid or a derivative of a weak acid of at least one element of Groups III, IV or V of the Periodic Table of Elements, by dry mixing the molecular sieve and the modifying agent, whereafter the resulting mixture is subjected to a first thermal treatment at a temperature in the range from about 80-100° C. followed by a second thermal treatment to promote polymerization at a temperature in the range from about 400-600° C.

2. Process according to claim 1, wherein the modifying agent contains at least one of said modifying agent that has the ability to polymerize at elevated temperature.

3. Process according to claim 1, wherein the molecular sieve is brought into contact with substantially dry powder of the modifying agent, followed by addition of liquid to form a slurry or paste.

4. Process according to claim 3, wherein said liquid is water.

5. Process according to claim 4, wherein the ratio of water to molecular sieve ranges from 2 to 0.25, preferably from 1.25 to 0.8.

6. Process according to claim 1, wherein the modifying agent is chosen from the group consisting of boric acid, silicic acid, acids of phosphor and salts thereof.

7. Process according to claim 6, wherein the modifying agent is selected from the group consisting of $H_3BO_3$, $NaH_2PO_2$, $Na_4P_2O_7.10H_2O$, $K_3PO_4$, $(NH_4)_2HPO_2$, $Na_2B_4O_7.10H_2O$ and $Si(OH)_4$.

8. Process according to claim 1, wherein the ratio of the amount of molecular sieve to modifying agent ranges from 100:1 to 1:1.

9. Process according to claim 8, wherein said ratio ranges from 10:1 to 3:1.

10. Modified molecular sieve prepared in accordance with claim 1.

11. A process for modifying a molecular sieve, whereby the molecular sieve is brought into contact with a modifying agent containing at least one weak acid, a salt of a weak acid or a derivative of a weak acid of at least one element of Groups III, IV or V of the Periodic Table of Elements, by dry mixing the molecular sieve and the modifying agent, followed by adding liquid to form a slurry or paste, whereafter the resulting mixture is subjected to a first thermal treatment at a temperature in the range from about 80-100° C. followed by a second thermal treatment to promote polymerization at a temperature in the range from about 400-600° C.

* * * * *

UNITED STATES PATENT AND TRADEMARK OFFICE
CERTIFICATE OF CORRECTION

PATENT NO. : 5,039,641
DATED : August 13, 1991
INVENTOR(S) : Etienne Vansant, et al.

It is certified that error appears in the above-identified patent and that said Letters Patent is hereby corrected as shown below:

Column 3, line 14, "or -65-form" should read --or $\gamma$-form--.

Column 3, line 19, "and the" should read --and fill the--.

Column 3, line 48, "or -65-form" should read --or $\gamma$-form--.

Column 6, line 50, "KNO3" should read --$KNO_3$--.

Column 9, line 12, "(SCGP:extrudates)" should read --(SCGP;extrudates)--.

Signed and Sealed this

Twentieth Day of July, 1993

Attest:

MICHAEL K. KIRK

*Attesting Officer*   *Acting Commissioner of Patents and Trademarks*